(12) United States Patent
Maier et al.

(10) Patent No.: US 12,478,698 B2
(45) Date of Patent: Nov. 25, 2025

(54) DISINFECTION MODULE

(71) Applicant: MERCEDES-BENZ GROUP AG, Stuttgart (DE)

(72) Inventors: Valentin Maier, Ispringen (DE); Tilo Volkmann, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 341 days.

(21) Appl. No.: 18/028,057

(22) PCT Filed: Sep. 10, 2021

(86) PCT No.: PCT/EP2021/074883
§ 371 (c)(1),
(2) Date: Mar. 23, 2023

(87) PCT Pub. No.: WO2022/069183
PCT Pub. Date: Apr. 7, 2022

(65) Prior Publication Data
US 2023/0338594 A1    Oct. 26, 2023

(30) Foreign Application Priority Data

Oct. 2, 2020  (DE) .................... 10 2020 006 029.3

(51) Int. Cl.
*A61L 2/10*    (2006.01)
*A61L 2/26*    (2006.01)

(52) U.S. Cl.
CPC ................ *A61L 2/10* (2013.01); *A61L 2/26* (2013.01); *A61L 2202/11* (2013.01); *A61L 2202/121* (2013.01); *A61L 2202/122* (2013.01); *A61L 2202/16* (2013.01)

(58) Field of Classification Search
None
See application file for complete search history.

(56) References Cited

U.S. PATENT DOCUMENTS

| | | | |
|---|---|---|---|
| 9,859,940 B1 * | 1/2018 | Lundsgaard | H04W 4/80 |
| 2007/0207066 A1 | 9/2007 | Thur et al. | |
| 2021/0283285 A1 | 9/2021 | Li et al. | |

FOREIGN PATENT DOCUMENTS

| | | | | |
|---|---|---|---|---|
| CN | 1221628 A | * | 7/1999 | A23B 2/003 |
| CN | 105522975 A | | 4/2016 | |
| CN | 111330035 A | | 6/2020 | |
| CN | 111692667 A | | 9/2020 | |
| DE | 20200574 U1 | | 4/2002 | |

(Continued)

OTHER PUBLICATIONS

Office Action dated Jul. 5, 2024 in related/corresponding DE Application No. 21 773 613.1.

(Continued)

*Primary Examiner* — Andrew Smyth
(74) *Attorney, Agent, or Firm* — PATENT PORTFOLIO BUILDERS PLLC

(57) ABSTRACT

A disinfection module has at least one light source that emits UV-C radiation for disinfecting an object. The disinfection module also has a housing in which the at least one light source is arranged. The housing is formed portably and has a connecting element for connecting the at least one light source to an electrical power source for supplying the at least one light source with electrical energy.

14 Claims, 4 Drawing Sheets

(56) References Cited

FOREIGN PATENT DOCUMENTS

Figure 1:
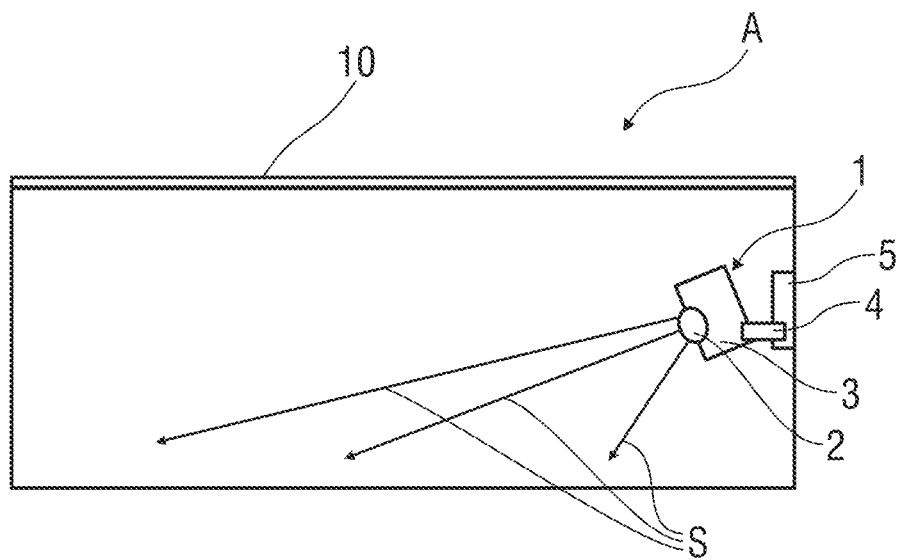

| | | | | |
|---|---|---|---|---|
| DE | 102009008031 A1 | | 6/2010 | |
| DE | 102010013946 A1 | * | 12/2011 | ............ H01R 35/04 |
| DE | 102017201441 A1 | * | 8/2018 | ............ A61B 90/80 |
| JP | H11318566 A | * | 11/1999 | |
| KR | 101517694 B1 | * | 5/2015 | ............... A61L 2/10 |

OTHER PUBLICATIONS

International Search Report and Written Opinion mailed Feb. 14, 2022 in related/corresponding International Application No. PCT/EP2021/074883.

Office Action created Aug. 6, 2021 in related/corresponding DE Application No. 10 2020 006 029.3.

Office Action dated Aug. 19, 2025 in related/corresponding CN Application No. 202180065164.0.

* cited by examiner

DISINFECTION MODULE

BACKGROUND AND SUMMARY OF THE INVENTION

Exemplary embodiments of the invention relate to a disinfection module having at least one light source that emits UV-C radiation for disinfecting an object, as well as to a vehicle having such a disinfection module.

A storage compartment for a vehicle is known from KR101517694 B1, wherein the storage compartment has a wireless charging device and LED modules on two sides of the housing. Furthermore, the storage compartment is formed to be movable in the X direction and the LED modules are formed in such a way that an object placed in the storage compartment can be disinfected.

Exemplary embodiments of the invention are directed to a novel disinfection module having at least one light source that emits UV-C radiation for disinfecting an object, and a vehicle having such a disinfection module.

A disinfection module having at least one light source that emits UV-C radiation for disinfecting an object comprises, according to the invention, a housing in which the at least one light source is arranged, wherein the housing is formed portably and has a connecting element for connecting the at least one light source with an electrical power source for supplying the at least one light source with electrical energy.

Because the disinfection module is formed portably, this can be used for disinfecting objects in different places as required, in particular where there is a power source that is compatible with the connecting element.

The disinfection module is, in particular, provided for application in a vehicle, wherein the disinfection module can, for example, be arranged in a storage compartment of a center console, in a glove compartment or in an otherwise suitable installation space of the vehicle.

For example, a vehicle user uses a storage space in the vehicle that is ergonomically readily accessible for them in order to safely store an object like, for example, a key, a smartphone, a wallet, or a face mask. The respective object can be disinfected by means of the disinfection module as well as being stored, so that the vehicle user can remove the object or leave it in the storage space almost bacteria and virus-free after a comparatively short disinfection time. To this end, the vehicle user is offered the disinfection as a selectable menu item on the part of the disinfection module and/or on the part of the vehicle.

It is additionally possible to disinfect a storage surface, in particular in the vehicle, by means of the disinfection module, thus a user of a different vehicle can at least be provided with a disinfected storage space.

If the connecting element has an interface of a serial bus system, then a power bank, i.e., a portable external battery, can also be used for operating the disinfection module.

Such a disinfection module enables the comparatively quick and easy disinfection of an object, for example of a smartphone, so that bacteria and/or viruses can be destroyed and a possible danger of infection can thus at least be significantly reduced.

An intensity of the UV-C radiation is thereby configured in such a way that damaging irradiated objects is ruled out as far as possible.

In an embodiment of the disinfection module, the housing is arranged pivotably on the connecting element, so that it is possible to align the at least one light source in relation to the object to be disinfected and/or in relation to the storage surface to be disinfected. An efficiency of the disinfection can thereby be increased.

The housing and the connecting element are connected with each other by means of a ball and socket joint in a development of the disinfection module, so that the at least one light source that emits UV-C radiation can be pivoted along several degrees of freedom. It is therefore, for example, also possible to align the housing with the UV-C radiation in such a way that all wall surfaces of a storage compartment in which the disinfection module is arranged can be disinfected.

In a further embodiment of the disinfection module, a protective cap is provided, which can at least be arranged on the housing for aligning the latter. In particular, an environment-dependent correct alignment, for example an angle of the housing with the light source that emits UV-C, can be ensured by means of the protective cap. The protective cap can thereby represent an attachment that can, for example, be provided in relation to vehicles in a series-specific manner. This protective cap is then arranged at a certain place in the interior of the vehicle in such a way that it almost defines a spatial orientation of the disinfection module. It is thus ensured that possible sources of error are minimized when installing and using the disinfection module and an efficient application of the module can take place.

A certain alignment of the disinfection module is thus adjusted by means of the protective cap arranged on the disinfection module, in particular the at least one light source that emits UV-C radiation, wherein the disinfection module is also protected from twisting and/or mechanical influences by means of the protective cap.

A possible embodiment of the disinfection module provides that a stand device is formed, arranged, or can be arranged on the housing. It is thus possible to position the disinfection module virtually freely, for example inside a storage compartment.

It can also be provided that, additionally or alternatively to the stand device, a suction cup is arranged or can be arranged on the housing, so that the disinfection module can also be fixed on a covering element or a wall surface of a storage compartment, and the UV-C radiation is thus emitted from above and/or from the side in the storage compartment.

In a possible development of the disinfection module, the connecting element comprises a cable, so that the disinfection module can be freely positioned according to an available length and depending on a position of the power source.

Furthermore, in a further embodiment, the disinfection module has a module for wirelessly charging at least one compatible mobile communication unit, in particular a smartphone. The module can thereby be supplied with electrical energy by means of the power source to which the disinfection module is connected.

In a further possible embodiment, a safety device, comprising at least one sensor, for determining a closed state of a storage compartment for arranging the object to be disinfected by means of the emitted UV-C radiation of the at least one light source is provided. Using detected signals of the sensor, which works based on lidar and/or can be formed as a light sensor, the closed state of the storage compartment in which the disinfection module is arranged can be detected, so that the detected signals can be used for both activating and also for deactivating the disinfection module.

Furthermore, the invention relates to a vehicle having a disinfection module, which has at least one light source that emits UV-C radiation, so that a vehicle user can disinfect one or more objects, such as e.g., a key and/or a smartphone, during the drive operation of the vehicle.

If a vehicle comprises such a disinfection module and the vehicle is a rental and/or an organized shared use vehicle, then the possibility exists of providing the vehicle with disinfected storage surfaces for a new or a different vehicle user.

BRIEF DESCRIPTION OF THE DRAWING FIGURES

Exemplary embodiments of the invention are illustrated in greater detail below by means of drawings.

Figure 2:
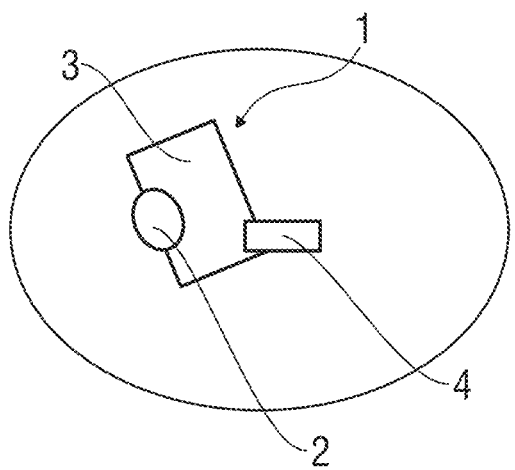
Figure 3:
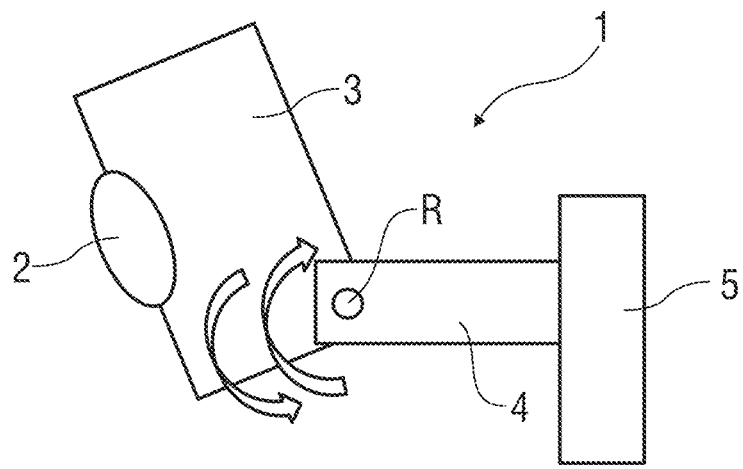
Figure 4:
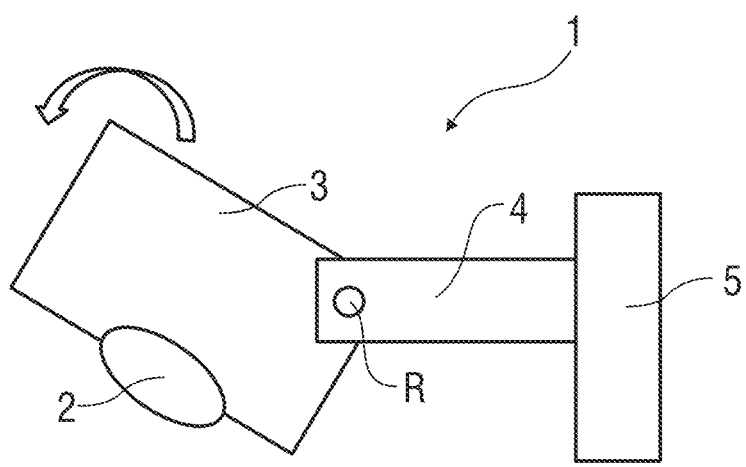
Figure 5:
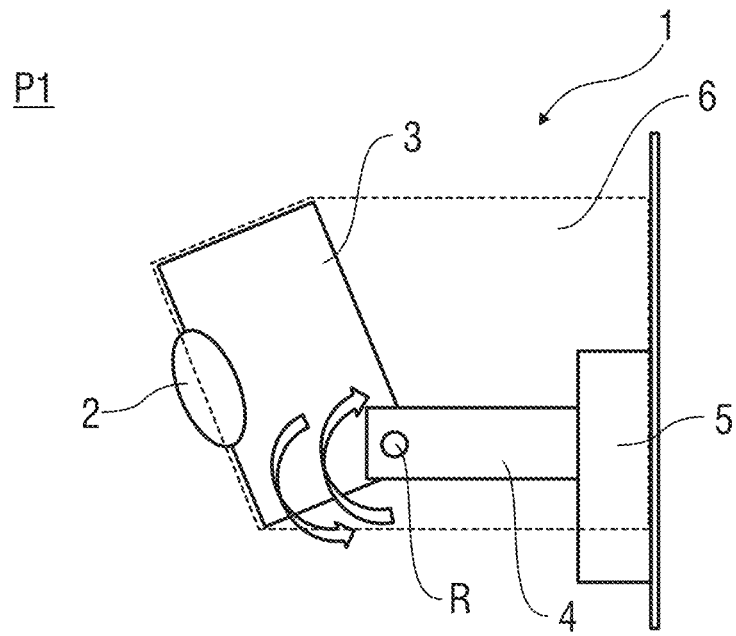
Figure 6:
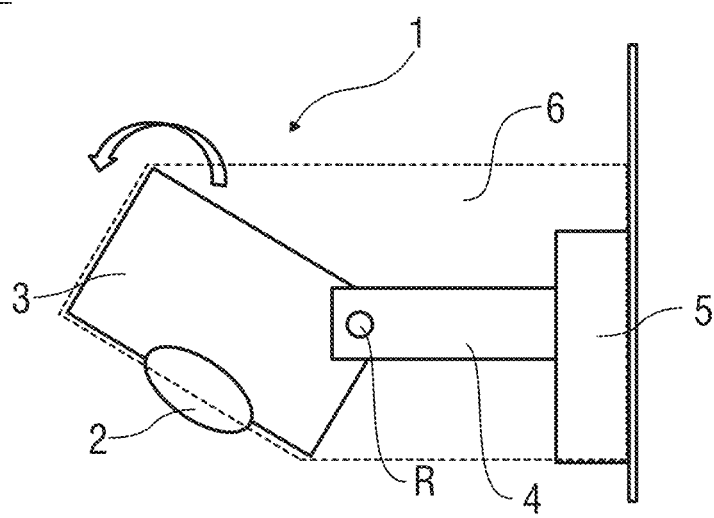
Figure 7:
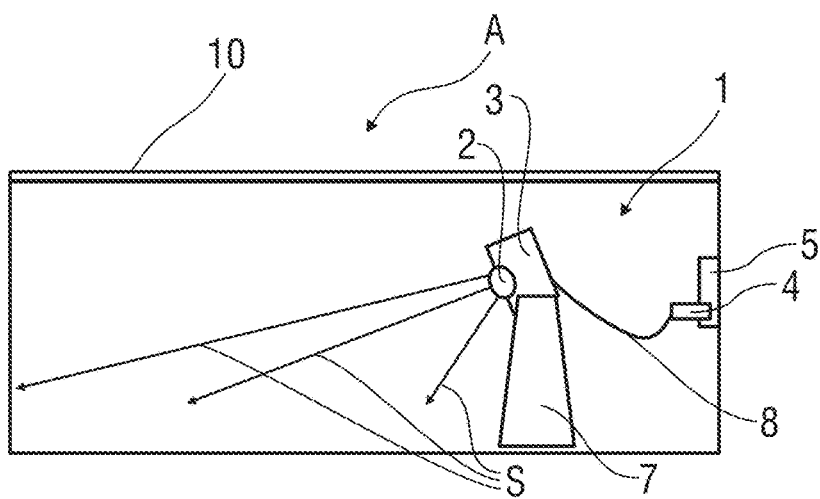
Figure 8:
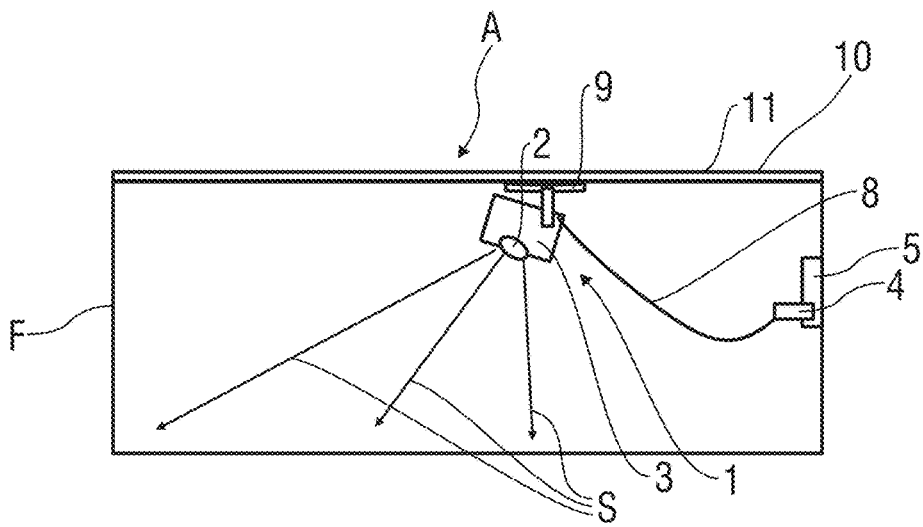
Figure 9:
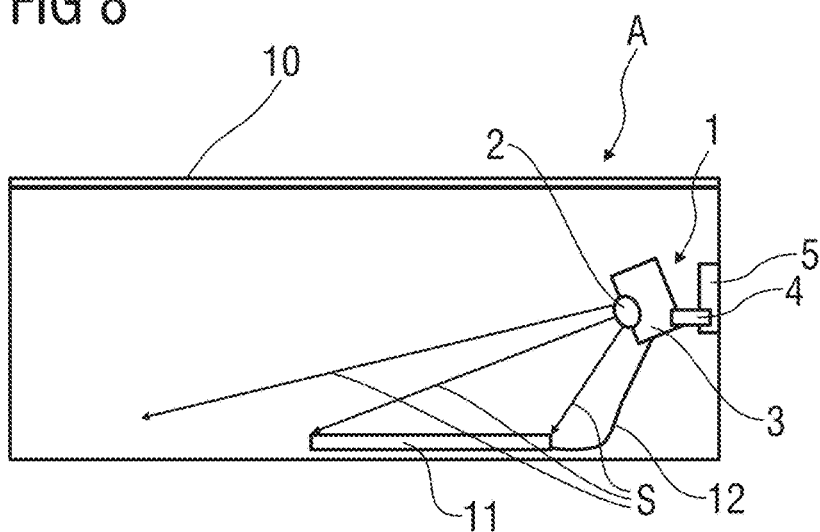

Here:

FIG. 1 schematically shows a storage compartment having a portable disinfection module, FIG. 2 schematically shows the disinfection module, FIG. 3 schematically shows the disinfection module having a housing in a first position, FIG. 4 schematically shows the disinfection module having the housing in a second position, FIG. 5 schematically shows the disinfection module having the housing in the first position and a protective cap, FIG. 6 schematically shows the disinfection module having the housing in the second position and the protective cap, FIG. 7 schematically shows the disinfection module having a stand device, FIG. 8 schematically shows the disinfection module having a suction cup and FIG. 9 schematically shows the disinfection module having a module for wireless charging of a mobile communication unit.

Parts that correspond to one another are provided with the same reference numerals in all figures.

DETAILED DESCRIPTION

FIG. 1 shows a closed storage compartment A having a portable disinfection module 1, wherein the storage compartment A is in a vehicle (not shown in more detail). In FIG. 2, the disinfection module 1 is represented separately.

The disinfection module 1 comprises a light source 2 that emits UV-C radiation S and is arranged in a housing 3 with its ballast electronics, wherein the disinfection module 1 additionally has a connecting element 4, in order to supply the light source 2 with its ballast electronics with electrical energy. In a possible embodiment, the light source 2 is formed as a light-emitting diode that emits UV-C radiation.

A disinfection by means of UV-C radiation is based on a physical process, which kills micro-organisms comparatively quickly and effectively.

In order to be able to disinfect objects belonging to the vehicle user, e.g., a key, a smartphone, a face mask and/or a wallet, in particular during the driving operation of the vehicle, the disinfection module 1 described in the following is formed portably.

The disinfection module 1 can thus be arranged in different areas of the vehicle, e.g., in a storage space in a center console, in a glove compartment or in another space that can be opened and closed.

The vehicle user thus not only has the possibility to store an object during the drive operation, but they can simultaneously disinfect this object by means of the disinfection module 1.

Since the disinfection module 1 is formed portably, this can be offered to a vehicle user as an attachment. It is thus, for example, possible, that the disinfection module 1 is taken with a vehicle user or the disinfection module 1 is attached to a vehicle and thus remains in the vehicle.

As described above, the disinfection module 1 comprises the housing 3 on which a connecting element 4 is arranged, which is formed as a plug connector, in particular for connecting with a serial bus system arranged in the vehicle.

To this end, a socket corresponding with the connecting element 4 is arranged as a power source 5 in the storage compartment A, into which socket the connecting element 4 can be plugged, so that the ballast electronics and the light source 2 that emits UV-C radiation S are supplied with electrical energy.

If the disinfection module 1 is connected with the serial bus system or another electrical power source 5 according to the present exemplary embodiment in FIG. 1, so that the disinfection module 1 is fixed in the storage compartment A, then the light source 2 that emits UV-C radiation S is aligned, in particular on a storage surface of the storage compartment A on which an object to be stored and to be disinfected is placed.

If the connecting element 4 of the disinfection module 1 is not connected, then the disinfection module 1 is a separated functional element, which is stored in the vehicle or is connected in an otherwise suitable place and can be used during operation.

An intensity of the UV-C radiation S of the disinfection module 1 is thereby designed in such a way that damaging an irradiated object, for example a smartphone, can be ruled out as far as possible.

FIGS. 3 and 4 show the disinfection module 1 in different positions P1, P2, wherein the disinfection module 1 is represented in FIG. 3 in a position P1 and in FIG. 4 in a further position P2.

The disinfection module 1 is movable along one degree of freedom according to the exemplary embodiment shown in FIGS. 3 and 4, wherein, for this purpose, the housing 3 is pivotably arranged on the connecting element 4 via an axis of rotation R.

The light source 2 that emits UV-C radiation S can thereby be aligned in relation to different environmental conditions, so that an optimized irradiation of objects and/or of a storage surface can be ensured, at least in a majority of storage compartments A.

A course of the axis of rotation R can differ from a course shown in the FIGS. 3 and 4, wherein a differently formed joint, for example a ball and socket joint can alternatively or additionally be provided, so that the disinfection module 1 can be moved along two degrees of freedom, in order to optimally align the light source 2 in relation to an object to be disinfected and/or a storage surface to be disinfected.

A linear adjustment of the housing 3 with the light source 2 and the connecting element 4 is also conceivable, wherein a telescopic guide can be suitable for this.

For ensuring an environment-dependent correct alignment of the disinfection module 1, for example in relation to an angle, i.e., an angle of inclination, a protective cap 6 as shown in FIGS. 5 and 6 is provided.

The protective cap 6 can be a plastic injection-molded part, which is supplied when acquiring the disinfection module 1, for example series-specifically.

The protective cap S is pulled over the disinfection module 1, wherein the light source 2 that emits UV-C radiation S is uncovered by the protective cap 6. According to FIGS. 5 and 6, the protective cap 6 is also pulled over the connecting element 4, wherein the protective cap 6 can also have a different shape, so that, for example, the connecting element 4 is also uncovered and is exposed.

In particular, the protective cap 6 is form-fitting, e.g., it can be attached to the disinfection module 1 by means of clipping on or latching on, wherein, by means of positioning the protective cap 6 in relation to the disinfection module 1, an alignment of the latter is adjusted and the disinfection module 1 is protected against twisting as well as against mechanical influences by means of the protective cap 6.

In FIG. 7, the disinfection module 1 is shown with a stand device 7, which is formed or fixedly arranged on the housing 3, or, if necessary, can be positioned on the housing 3 e.g., can be form-fittingly attached.

Compared to the further embodiments described above, the disinfection module 1 can be freely positioned, for example in a storage compartment A, as shown, wherein the connecting element 4 comprises a cable 8 on which the plug connector is arranged.

By means of the stand device 7, the disinfection module 1 can fundamentally be freely positioned in the space, wherein the cable 8 has a corresponding length for this.

Alternatively, or additionally to the stand device 7, a suction cup 9 is arranged or can be arranged on the housing 3 of the disinfection module 1, as is shown in FIG. 8. The disinfection module 1 can also be fixed on a covering element 10 or a wall surface F of the storage compartment A by means of the suction cup 9, so that the UV-C radiation S is emitted from above and/or the side in the storage compartment A. It is therefore necessary that the covering element 10 and/or the wall surfaces F have a corresponding surface.

One possible embodiment of the disinfection module 1 is represented in FIG. 9, wherein the disinfection module 1 comprises a module 11 for wireless charging of a mobile communication unit, in particular a smartphone, and/or another such chargeable device.

This module 11, which functions according to the principle of a so-called wireless midi interface, comprises a further connecting element 12 for connecting the module 11 with the power source 5.

The module 11 is thereby compatible with wireless charging by means of the stand device 7, by means of the suction cup 9 and/or another device, so that both the disinfection module 1 and also the module 11 can be used simultaneously.

The module 11 can be fixed on the storage surface of the storage compartment A by means of the suction cup 9, so that the module 11 sliding around during the driving operation of the vehicle can be ruled out as far as possible.

Furthermore, a safety device (not shown in more detail) can be provided, which has a lidar-based sensor, a light sensor and/or another suitable sensor. Using detected signals of the sensor or sensors, a closed state of the storage compartment A can be detected. For example, a distance between the covering element 10 of the storage compartment A and a sensor of the safety device can be detected to detect the closed state.

In particular, the safety device can serve to activate and deactivate the disinfection module 1 when it is detected that the storage compartment A is closed.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A disinfection module, comprising:
at least one light source configured to emit UV-C radiation to disinfect an object;
a housing in which the at least one light source is arranged, wherein the housing is portable, and wherein the at least one light source is configured to emit the UV-C radiation outside of the housing; and
a connecting element arranged pivotably about at least one axis of rotation on the housing and configured to connect the at least one light source with an electrical power source to supply the at least one light source with electrical energy; and
wherein the disinfection module further comprises: a protective cap arranged over at least the housing, wherein the at least one light source is not covered by the protective cap.

2. A disinfection module, comprising:
at least one light source configured to emit UV-C radiation to disinfect an object; and
a housing in which the at least one light source is arranged,
wherein the housing is portable and has a connecting element configured to connect the at least one light source with an electrical power source to supply the at least one light source with electrical energy, wherein the housing and the connecting element are connected with each other by a ball and socket joint; and
wherein the disinfection module further comprises: a protective cap arranged over at least the housing, wherein the at least one light source is not covered by the protective cap.

3. The disinfection module of claim 1, further comprising: the protective cap configured to be arranged on the housing to align the housing.

4. The disinfection module of claim 1, further comprising: a stand device arranged or arrangeable on the housing.

5. The disinfection module of claim 1, further comprising: a suction cup arranged or arrangeable on the housing.

6. The disinfection module of claim 1, wherein the connecting element comprises a cable.

7. The disinfection module of claim 1, further comprising: a wireless charging module configured to charge a mobile communication device.

8. The disinfection module of claim 1, further comprising: a safety device, which comprises at least one sensor, configured to determine a closed state of a storage compartment external to the disinfection module.

9. A vehicle, comprising:
a disinfection module, which comprises
at least one light source configured to emit UV-C radiation to disinfect an object; and
a housing in which the at least one light source is arranged, wherein the housing is portable, and wherein the at least one light source is configured to emit the UV-C radiation outside of the housing; and a connecting element arranged pivotably about at least one axis of rotation on the housing and configured to connect the at least one light source with an electrical power source to supply the at least one light source with electrical energy; and wherein the disinfection module further comprises: a protective cap arranged over at least the housing, wherein the at least one light source is not covered by the protective cap.

10. The vehicle of claim 9, further comprising:

a storage compartment; and a power source arranged in the storage compartment, configured to supply the electrical energy, and having a socket, wherein the connecting element is pluggable into and unpluggable from the socket of the power source.

11. The vehicle of claim 10, wherein the disinfection module further comprises:

a safety device having at least one sensor and configured to determine a closed state of the storage compartment.

12. The vehicle of claim 10, wherein the vehicle is a specific series of vehicles and the protective cap has a shape configured for the specific series of the vehicles so that when the connecting element is plugged into the socket of the power source and the protective cap is arranged in the storage compartment, the protective cap defines a spatial orientation of the disinfection module.

13. The vehicle of claim 10, wherein the at least one light source is configured to emit the UV-C radiation outside of the housing into the storage compartment.

14. The disinfection module of claim 2, wherein the at least one light source is configured to emit the UV-C radiation outside of the housing.

* * * * *